A. KNOBEL.
CLOTH MEASURING, WINDING, AND REWINDING MACHINE.
APPLICATION FILED MAR. 27, 1907.

924,998.

Patented June 15, 1909.
4 SHEETS—SHEET 1.

WITNESSES:
John E. Heller.
M. C. Rollwage.

INVENTOR
Abraham Knobel.

A. KNOBEL.
CLOTH MEASURING, WINDING, AND REWINDING MACHINE.
APPLICATION FILED MAR. 27, 1907.

924,998.

Patented June 15, 1909.
4 SHEETS—SHEET 2.

WITNESSES:
John E. Heller.
M. C. Rollwage.

INVENTOR
Abraham Knobel

A. KNOBEL.
CLOTH MEASURING, WINDING, AND REWINDING MACHINE.
APPLICATION FILED MAR. 27, 1907.
924,998.
Patented June 15, 1909.
4 SHEETS—SHEET 3.
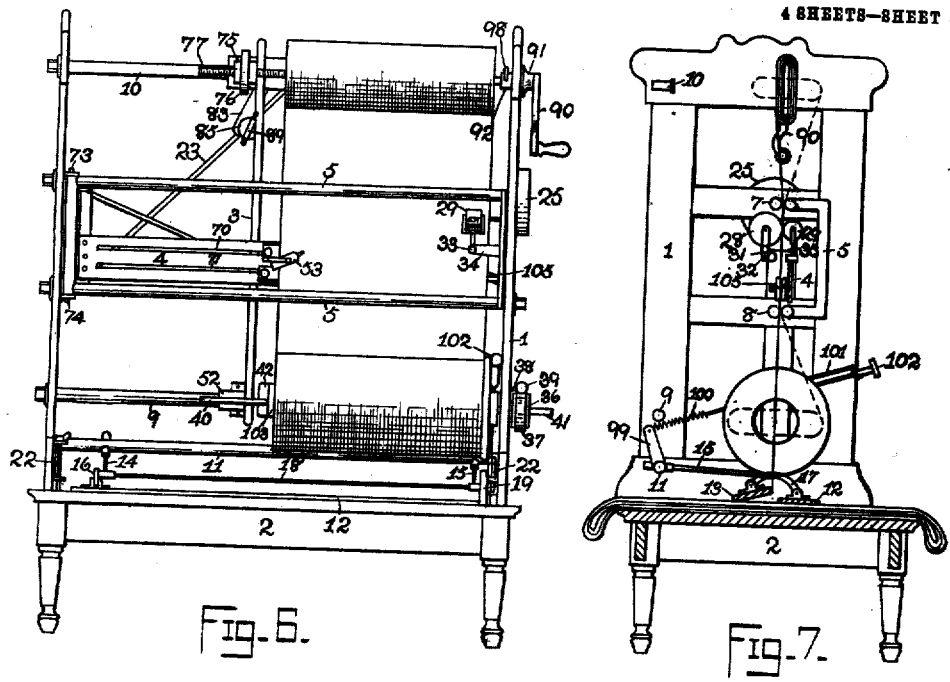
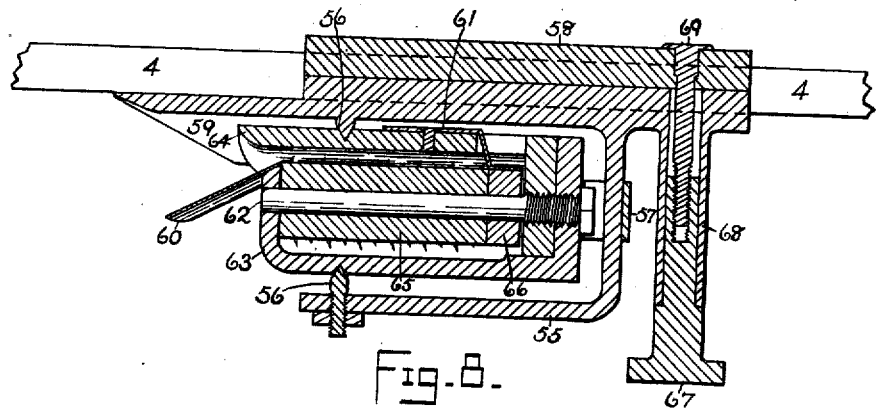
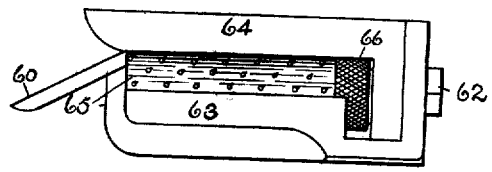
WITNESSES:
John E. Heller.
M. C. Rollwage.
INVENTOR
Abraham Knobel A. KNOBEL.
CLOTH MEASURING, WINDING, AND REWINDING MACHINE.
APPLICATION FILED MAR. 27, 1907.

924,998.

Patented June 15, 1909.
4 SHEETS—SHEET 4.

WITNESSES:
John E. Heller.
M. C. Rollwage.

INVENTOR
Abraham Knobel

THE NORRIS PETERS CO., WASHINGTON, D. C.

UNITED STATES PATENT OFFICE.

ABRAHAM KNOBEL, OF LOUISVILLE, KENTUCKY, ASSIGNOR TO G. TALBOT HOLLY, OF LOUISVILLE, KENTUCKY.

CLOTH MEASURING, WINDING, AND REWINDING MACHINE.

No. 924,998.      Specification of Letters Patent.      Patented June 15, 1909.

Application filed March 27, 1907. Serial No. 364,903.

*To all whom it may concern:*

Be it known that I, ABRAHAM KNOBEL, a citizen of the United States, residing at Louisville, in the county of Jefferson and State of Kentucky, have invented a new and useful Cloth Measuring, Winding, and Rewinding Machine, of which the following is a specification.

This invention relates to machines for measuring, winding, and rewinding webs of fabric and other similar materials; and the objects of my improvement are, to wind dress-goods and the like from the folded condition upon boards into bolts smoothly, with the requisite firmness, making the ends of the bolts square, straight and smooth in order that the bolt may present a neat appearance on the stock-shelves; to rewind dress-goods and the like from the bolted condition, firmly and neatly; to wind and rewind goods firmly and neatly with little or no attention of the operator beside starting; to measure goods accurately simultaneously with winding or rewinding; to facilitate taking stock; to facilitate checking hand measurements and mill measurements; to put goods into neat condition, which have been gotten into bad condition by hand; to save labor; to save time, and to minimize wearing and soiling goods in the operation of winding, rewinding, and measuring. These objects I attain by means of the mechanism illustrated in the accompanying drawings, in which—

Figure 1:
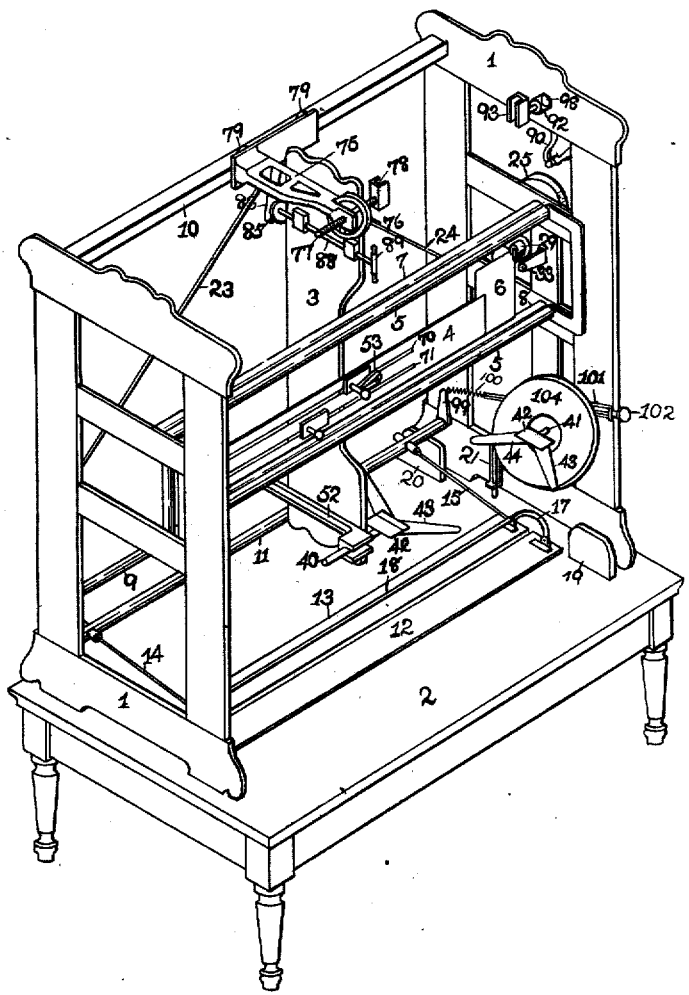
Figure 2:
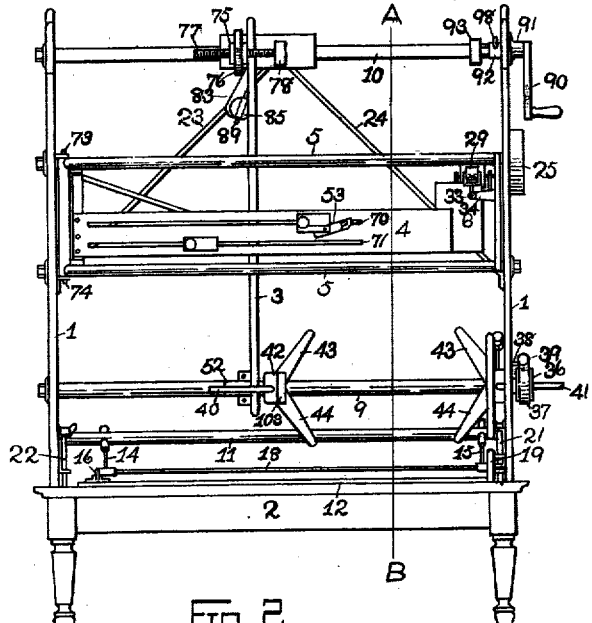
Figure 3:
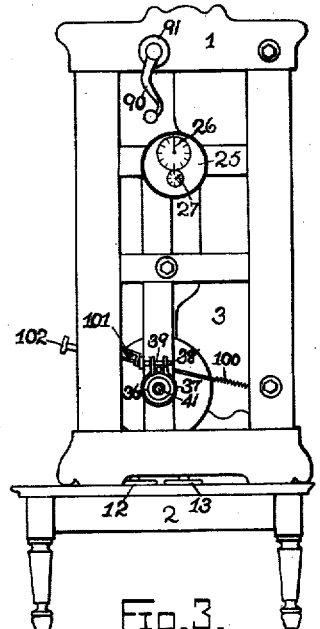
Figure 4:
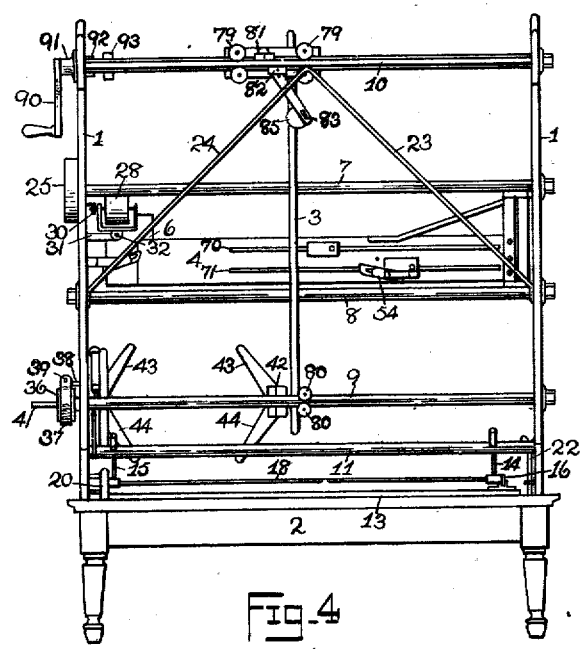
Figure 5:
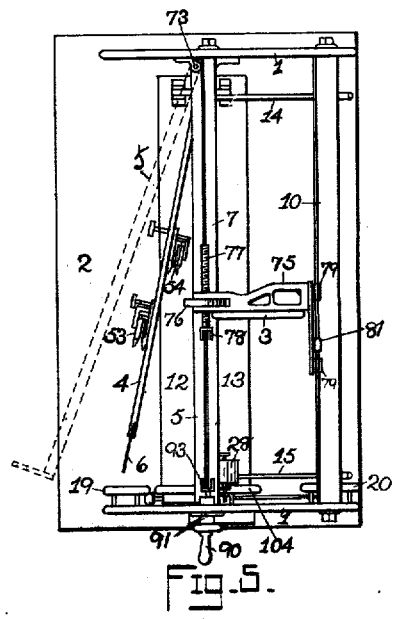
Figure 10:
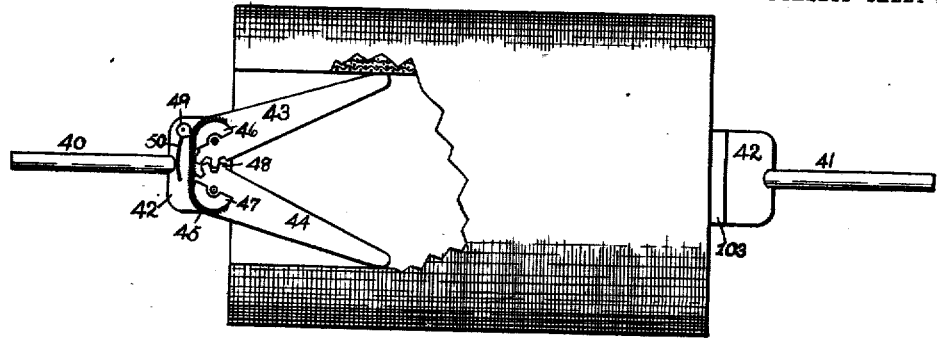
Figure 11:
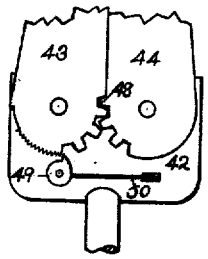
Figure 12:
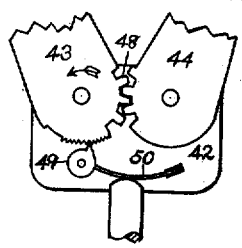
Figure 13:
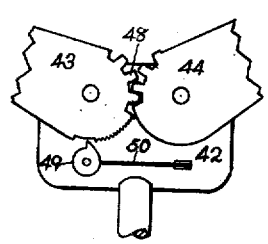
Figure 14:
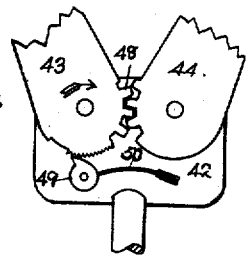
Figure 15:
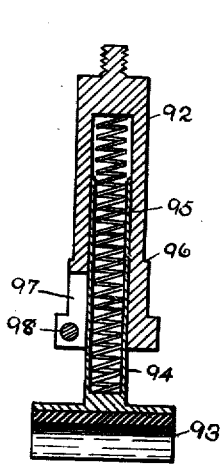

Figure 1 is a perspective view; Fig. 2, a front elevation; Fig. 3, a right-hand end elevation; Fig. 4, a rear elevation; Fig. 5, a top plan view; Fig. 6, a front elevation showing the machine in operation; Fig. 7, a transverse sectional elevation showing the inside of the right-hand end; Fig. 8, a detail sectional view of one of the temples and its bracket; Fig. 9, a detail side view of one of the temples; Fig. 10, an elevation, partly in section, of a bolt of cloth with the bolt-pivots inserted; Fig. 11, a detail view of a bolt-pivot closed; Fig. 12, a detail view of a bolt-pivot opening; Fig. 13, a detail view of a bolt-pivot entirely open; Fig. 14, a detail view of a bolt-pivot closing; Fig. 15, a longitudinal sectional view of the crank-shaft and its board-socket; and, Fig. 16, a detail view of the adjustable carriage clamp.

Similar reference numerals refer to similar parts throughout the several views of the drawings.

The frame 1, the table 2, and the vertical adjustable pivot-carriage 3, constitute the body of the machine. The frame 1 is made up of upright end pieces, preferably of wood, and held apart and braced by rods or tubes 7, 8, 11, and the track 10, and further braced by diagonal rods or tubes 23 and 24. The frame, thus formed, is placed upon table 2 and fastened thereon by means of thumb-screws 21 and 22, which screw into threaded sockets secured in the top of the table. Thus a rigid and light frame work is provided for the mechanism.

For the purpose of rewinding fabric which is already in the form of bolts wound on boards, means are provided at the lower part of the frame for pivoting the bolt to be unwound, and at the upper part of the frame for pivoting the board upon which the fabric is to be wound. The bolt-pivots 40 and 41 are constructed as follows:—A stem carries a flat plate 42, upon which are pivotally mounted two symmetrical spreaders 43 and 44 (Figs. 11–14). Springs 45 are attached to spreaders 43 and 44 at the base on grooved sectors 46 and 47, in such a way that the outer ends of the spreaders are spread apart thereby. The spreaders 43 and 44 are provided at their inner ends with intermeshing gear teeth 48, which cause them to open and close at equal angles with the stem 40 or 41. The spreaders 43 and 44, being pivoted on the surface of plate 42, the forward end of the plate forms a ledge or flange 103 extending at right-angles from the undersurface of the spreaders. In order to insert pivots 40 and 41 into the bolt to be unwound and measured, spreaders 43 and 44 are grasped and closed together (Fig. 11). The fabric is slightly separated from the board at the end of the bolt, and the point of the spreaders inserted between the fabric and the board and pushed in until the ledge 103 rests firmly against the end of the board. Spring 45 will now spread the ends of the spreader until they reach the edges of the bolt-board, and press against the fabric. It will be understood that since these spreaders 43 and 44 open symmetrically relatively to the stem, the stem will automatically extend on the axis of the bolt-board. When, however, tension is placed upon the right-hand pivot 40, it has been found that there is a tendency to raise the bolt so that the spreaders close somewhat, the bolt is drawn upward, and the axis of the bolt and of the pivot stems no longer aline. In the case of a heavy bolt there is a tendency also of the bolt to drop and to draw these parts out of alinement by gravity. In order to obviate this difficulty, the locking mechanism illustrated in Figs. 11-14 has been devised. This locking mechanism consists of a ratchet-pawl 49 and the spring 50. Small ratchet teeth are provided on the periphery of spreader 43, and at either end of the series of ratchet teeth a gap is formed. Fig. 11 shows the spreaders in the closed position, and spring 50 is holding pawl 49 in such a position that the point is extending idly into inner gap. When the spreaders 43 and 44 are allowed to open, the outer wall of the inner gap comes in contact with the pawl, turns it backward against the force of spring 50, and flexes the spring, so that the pawl snaps into the successive ratchet teeth and prevents closing the spreaders. This is the case until the spreaders are fully open (Fig. 13), when pawl 49 is sprung into the outer gap and rests in the same position as in Fig. 11. When spreaders 43 and 44 are closing, the inner wall of the outer gap strikes the pawl, flexes spring 50, and the pawl drags on its back over the surface of the ratchet teeth until the spreaders are fully closed, when it again takes the position shown in Fig. 11. It will be understood that by these means the spreaders cannot be closed by tension or gravity while they are opening and can only be closed by hand or in any other way when they have reached the limit of their outward motion, which occurs only when all of the fabric has been unwound from the bolt-board. Then, however, the spreaders may be readily closed with the hands without touching the pawl.

In order to provide tension for the bolt, and to regulate this tension so that the goods may be wound more or less firmly, the stem of one of the pivots, 41, is made square. A tension-drum 36 is mounted on the right-hand frame, and provided with a square hole into which stem 41 fits somewhat loosely, so that the stem may be readily inserted and may turn the drum. A tension-strap 37 is mounted on drum 36, the ends of which are turned outward and joined by a tension-screw 39, having a milled head. A tension-stud 38 extends from the frame between the ends of the tension-strap to prevent it from turning. By these means the tension on the bolt may be regulated by turning the screw 39.

The board upon which the fabric is rewound is mounted in upper board-sockets 93 and 78. Socket 93 is driven by means of a crank 90, through crank-shaft 92, mounted in crank-shaft-bearing 91. In practice, in winding double fold goods, it is desirable to bring the board flush with the selvage edge of the goods. If the winding-board to be used is shorter than the width of the goods, it is apparent that the end that is placed in socket 93 must be within the line followed by the crease of the goods. To provide for this, socket 93 is made adjustable in the manner shown in Fig. 15, where 92 is a hollow shaft, 94 a hollow stem of socket 93, and 95 an extension spring in the bore of the stem and the crank-shaft adapted to throw out stem 94. 97 is a slit cut in the wall of the inner end of the crank-shaft and 98 a transverse screw having a wing-head for clamping the end of the crank-shaft tightly about stem 94.

Socket 78 is pivoted to rotate idly upon its stem 77 which is screw threaded and adjustable lengthwise by means of a threaded hand-wheel 76, mounted thereon. It will be understood that both sockets 93 and 78 are adjustable, and that if a board be placed in the sockets, and clamp-screw 98 released, socket 93 will follow its end of the board while socket 78 is being adjusted by means of hand-wheel 76. In this way the end of the board to be made flush with the selvage edge may be adjusted without paying attention to the other end, and, after the adjustment is completed, screw 98 may be screwed up so as to set socket 93 in the required position and hand-wheel 76 may be turned to set the board firmly by pressure between the sockets.

If it is desired to bolt a piece of goods from the folded condition (Fig. 7), the tension-bars 12, 13 are used. These bars are pivoted at each end on pivot-brackets 16 and 17, which, in turn, are united rigidly by means of a bar 18, parallel with said tension bars to keep them in parallel alinement with each other. This bar 18, in turn, is joined to a pivot-bar 11 pivoted at each end on the uprights of the frame, by means of adjustable arms 14 and 15. The arms 14 and 15 are adapted to slide in tranvserse tubes secured through and near the ends of pivot-bar 11 and are kept parallel to each other by said pivot-bar. It will be understood that by these means tension-bars 12, 13 may be raised from the surface of table 2 and lowered but will always remain in parallel relation with the surface of the table. In order to place the folded goods upon the table, tension-bars 12, 13 are pushed back by sliding rods 14 and 15 backward through the guide-tubes in rod 11 until the tension-bars rest upon the rear gage-block 20. After the goods has been placed, the tension-bars are brought forward to the limit of their forward motion and allowed to rest upon the piece of goods. The end of the goods is started up between the tension-bars and threaded up to the winding-board in the upper pivots 78 and 93. It will be understood that, since the tension-bars 12 and 13 are kept always in parallel relation with the top of the table, if the piece of goods is narrow, the left-hand ends of the bars, which do not rest upon the goods, will not be allowed to sag down so as to raise the right-hand end, but the tension-bars will press evenly across the entire width of the goods, thus producing the even tension required. The proper alinement of the right-hand selvage edge, or, if the goods is double fold, the creased edge, is attained by placing the piece of goods against gage-blocks 19 and 20. The tension or pressure of the tension-bars 12, 13 is regulated by means of a crank 99 Fig. 1 secured on pivot-bar 11, a spring 100 attached to said crank, a bracket 101 arranged stationary between the right-hand end of the frame and disk 104, and a tension-screw 102 adapted to produce more or less tension on spring 100. It will be understood that as screw 102 is turned up, spring 100 draws more upon crank 99, which, in turn, rotates pivot-rod 11, which, in turn, presses rods 14 and 15 downward at their outer ends, and thus increases the pressure upon tension-bars 12, 13.

In order to provide for goods of different width, the bearing for pivots 77 and 40 are placed on a vertical pivot carriage 3 which is adjustable. This is attained by mounting the lower bracket, 52, on frame-rod 9 by means of bearing-rollers 80, and the upper bearing by means of bearing-bracket 75 and bearing-rollers 79 on the upper track and frame-bar 10, Figs. 4 and 16. The bar 10 is preferably made of wood, having a metal track secured in a vertical plane on the front edge of the wood bar, as shown in section in Fig. 7.

Figure 16:
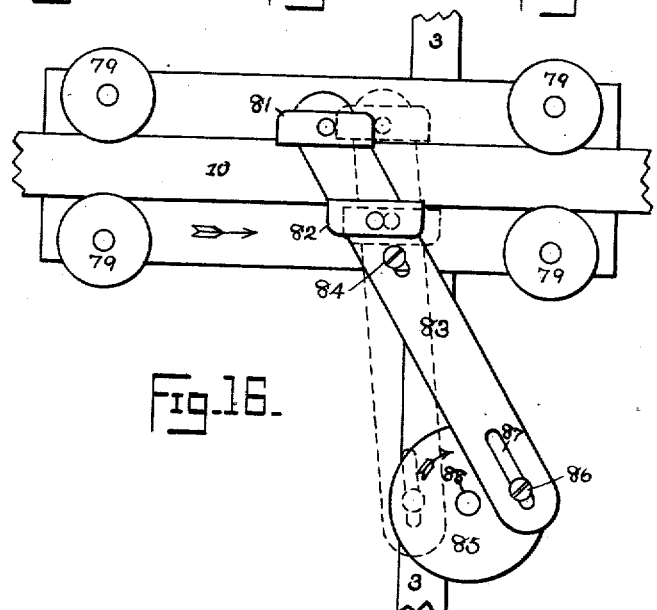

The adjustable pivots, with their carriage 3, are manipulated through the handle 89 located at the front of the machine and secured to a rod 88, which in turn is rotatably mounted in boxes on carriage 3. After carriage 3 has been located in the proper position, the carriage with its pivots may be locked in that position by turning handle 89. This is accomplished by menas of a locking device arranged on pivot-bracket 75 (Figs. 4, 16). A clamping-bar 83 is pivoted to bracket 75 at 84, having a slotted hole to allow slight vertical movement. On bar 83 are pivoted clamping-blocks 81, and 82, one above and the other below track 10, having their edges adjacent the track slightly grooved so as to embrace the edges of the track. The lower end of bar 83 is provided with a longitudinal slotted hole which works over a crank-pin 86 secured in crank-disk 85 which, in turn, is secured on shaft 88. Blocks 81 and 82 are so placed upon bar 83, that when it is in a vertical position, shown by dotted lines (Fig. 16) they do not touch the edges of track 10, but when disk 85 is rotated in the direction of the arrow, bar 83 is thrown to the angle shown, blocks 81 and 82 approach each other and clamp the track firmly. It will be understood that the force applied to socket 78 to press it against and hold the board firmly pushes bracket 75 in the direction of the arrow, thus pushing upon pivot 84, and that the more pressure put upon pivot 84, the greater will be the clamping force of blocks 81 and 82. It will also be appreciated that the clamp may be released by a half turn of handle 89, and that thus a quick and secure adjustment for both pivots is provided.

It will be appreciated that in order to render the ends of the bolt of goods square and straight the edges of the fabric must be kept constantly in the same line while they are being wound upon the winding-board. This I accomplish by means of temples 53, 54, and 105, of the form commonly used, with improved self-adjusting means. These temples draw the selvage into them to a certain line, when they automatically tilt to the reverse position and prevent the selvage entering further (Fig. 6). Two of the temples, namely, 53 and 54, are mounted upon a swinging-bar 4, Fig. 5, while the third temple, 105, is mounted upon the inner side of the right-hand end of frame 1, for purposes hereafter explained.

In the case of double fold goods, both selvages travel together, and the opposite edge of the piece of goods is formed by the crease. In order to preserve the proper alinement of the creased edge, the fabric is folded over the swinging bar 4, so that the thin plate 6 at the end of the bar guides the inner part of the crease. The temples 53 and 54, one mounted on either side of bar 4, are adjustable longitudinally of bar 4 and independently of each other and may be brought to such a position that the selvages of the fabric are caused to register with each other. Bar 4 is hinged to frame 1 at its left hand end so that it swings like a gate (Fig. 5) to facilitate placing double width goods over it and single width goods behind it.

Bars 7 and 8 of frame 1 are so placed as to guide the goods in a plane joining the upper and lower pivots, resisting the tendency to run out of this plane due to the eccentricity of the surface of the bolts. These bars guide the fabric, however, only at the back, but a similar guide is provided in front by means of a gate 5, having upper and lower bars parallel with and registering with bars 7 and 8. Gate 5 is hinged at its left-hand end to the left-hand upright of frame 1. It is shown swung out by the dotted lines in Fig. 5. The dotted lines in Fig. 7 show how the fabric is guided by bars 7 and 8 and the gate. The temples 53 and 54 are mounted in brackets 55 Fig. 8 on pivots 56 and 57 secured in the brackets. Bracket 55 is provided with a plate which rests against bar 4 on the side adjacent the temple, and which has an extension of rectangular cross section adapted to extend half way through a longitudinal slot made through bar 4. The plate of bracket 55 is provided with a tubular extension 68 in which is rotatably mounted an internally threaded stem 67 surmounted by a milled-head. A plate 58, having a similar extension to that of bracket 55, is placed on the opposite side of bar 4 and provided with a bolt 69 which extends through the slot in bar 4 and engages stem 67 so that when stem 67 is turned the plate of bracket 55 and plate 58 are clamped together upon bar 4 and lock the temple in position. The head of stem 67 serves as a handle, also, with which to slide the temple bracket along the slot in bar 4 to the desired position. A bracket, 57, on bracket 55, serves to limit the amplitude of oscillation of the temple frame. The temple frame consists of pieces 63 and 64 and need not be described because it is well known. The part 63, however, is provided with a nose 60, extending from its forward end and corresponding with an oppositely inclined nose 59 on the forward end of bracket 55. These noses 59 and 60, serve to render the temples self-feeding by guiding the selvage of the goods into them. The temple roller 65 is loosely mounted on pin 62 in the usual way. At the rear of roller 65, also mounted on pin 62, is a knurled or similarly roughened roller 66, which forms part of the self-adjusting means of the temples. A spring 61 Fig. 8 is secured to part 64 of the temple frame, extends inward through a slot in part 64, and presses against the periphery of roller 66. It will be understood that when the selvage of the piece of goods operated upon is drawn in by roller 65 till it is fed in between roller 66 and spring 61, the spring will grasp the selvage, and the rear end of the temple will be carried along in the direction of the motion of the cloth, thus tilting the temple in position to throw the selvage out. But as soon as the selvage leaves spring 61, the rear end of the temple drops by gravity to the pulling position again. Thus the edge of the fabric is kept drawn continuously and automatically to the same line. Temple 105 is constructed similarly to 53 and 54 but is mounted in a stationary bracket secured to the frame. It is not required to be adjusted longitudinally relative to the machine since the right-hand edge of the fabric is required always to travel in the same line, whatever may be the width of the goods. Now if single fold goods is being operated upon, the right-hand selvage is controlled by temple 105, whereas the left-hand selvage is controlled by temple 54 on the rear surface of bar 4.

The measuring apparatus is located at the right-hand end of the machine in the plane with the fabric, between bars 7 and 8, where the fabric is always kept in the same plane.

The measuring apparatus consists of a measuring roller 28 of a predetermined circumference, say of ¼ yard, mounted in a caster bracket Fig. 4 pivoted at 32 on a stationary bracket 31 secured to the right-hand end of frame 1. The shaft of roller 28 is connected by a tumbler-coupling with a counter 25 of the usual form, having a dial and hands plainly visible on the right-hand end of frame 1. The dial is so graduated as to show eighths of a yard and yards, say to 100. To keep the fabric always in firm operative contact with measuring-roller 28 and prevent loss by slipping a soft rubber presser-roller 29 is provided on the front side of the fabric mounted also in a caster bracket pivoted at 33 and mounted on a hinged bracket 34 secured to the front end of frame 1 in such a manner that roller 29 may be swung out of the way when the fabric is being placed in position. Presser-roller 29 is kept in firm contact with the fabric by means of a spring fastening-latch 35 secured on bracket 31. It is obvious that by these means the cloth is accurately measured as it passes upward to be wound upon the bolt-board.

Aside from accurate measuring, the most essential function of this machine is winding the fabric smoothly upon the bolt-board in such a manner that the selvage edges form a perfectly straight surface perpendicular to the axis of the bolt, in order that the goods may not be wrinkled and that the ends of the bolts may present a neat and attractive appearance on the stock shelves. Great difficulty has heretofore been experienced in accomplishing this. I have found that in order to attain these results it is necessary to deliver the fabric from the unwinding bolt to the winding bolt on a straight line joining the axes of these bolts, because, in the case of double fold goods, any attempt to pass the goods over rollers or rods or other curved surfaces in its path magnifies the discrepancy in length between the inner and outer layers of the goods at the selvage edge, so that the inner layer gains upon the outer, and the inner must therefore be creased at intervals, and the selvage edges have an irresistible tendency to run out of register with each other. This difficulty is altogether obviated by my improvement.

To operate the machine, pivots 40 and 41 are inserted in the ends of the bolt to be measured as herein previously described. The square pivot 41 is inserted through tension-drum 36, pivot 40 may be held in line with it by the right-hand, and bearing-bracket 52 drawn over it by operating handle 89 and shifting carriage 3 with the left-hand. The bolt is now mounted. Gate 5 and bar 4 are swung out. If the goods is double fold, it is placed over bar 4 with one fold on either side. The end of the fabric is then placed against roller 28 and roller 29 secured against it. The end of the goods is now drawn up above bar 7, gate 5 closed upon the fabric, and the end of the fabric allowed to rest over bar 7. A bolt-board is now adjusted in sockets 78 and 93. The end of the goods is drawn up and placed about the bolt-board, when the goods may be wound on the board by operating crank 90. In each case the hands of counter 25 should be placed at zero before the fabric is placed against the measuring roller. After the fabric has been started on the rewinding bolt-board, temples 53 and 54 are brought up in position to guide the selvage edges properly.

When the fabric has been wound upon the board, the resulting bolt may be released by turning hand-wheel 76 in the proper direction to withdraw socket 78. With single fold goods the stationary temple 105, and temple 54 on the back of bar 4 are used to guide the edges. The manner of handling goods in the folded condition has been previously described.

Having thus described my invention so that any one skilled in the art pertaining thereto may make and use it, I claim—

1. In a fabric measuring and re-winding machine, the combination of means for pivoting a bolt of goods, means for pivoting a winding-board, and means for guiding the fabric in the plane joining the axes of the bolt and the winding-board, substantially as specified.

2. In a cloth measuring, winding and rewinding machine, a frame, pivots for mounting a winding board mounted in said frame, means for paying out and applying tension to the cloth, and a caster-mounted measuring-wheel in contact with the cloth.

3. In a fabric measuring and winding machine, the combination of means for pivoting a bolt of goods, means for pivoting and driving a winding-board, means for guiding the fabric in the plane joining the bolt and the winding-board comprising two sets of parallel bars, and means for measuring the fabric comprising a measuring-roller and a presser-roller coöperating with said measuring-roller located between said sets of parallel bars, and a counter to register the revolutions of said measuring-roller and coöperating therewith.

4. In a fabric measuring machine, the combination of means for paying out the fabric, means for pivoting and driving a winding-board, means for guiding the fabric in a substantially constant plane, and means for guiding the edges of the fabric in constant lines and keeping the web of fabric taut and smooth laterally comprising automatically adjustable temples, substantially as described.

5. In a fabric measuring and winding machine, the combination of means for paying out the fabric, means for pivoting and driving a winding-board, and means for automatically training the selvage edges of the fabric in constant lines, said training means comprising the conventional temple having its frame trunnioned and provided in its rear end with means for frictionally engaging the selvage edge of the fabric, substantially as described.

6. In a fabric measuring and winding machine, the combination of a frame, journal bearings mounted in said frame, and automatic symmetrically-adjusting pivots for a bolt of fabric comprising a stem, arms adapted to spread symmetrically relative to said stem and attached to said stem, substantially as described.

7. In a fabric measuring and winding machine, the combination of a frame, journal bearings mounted in said frame, and automatic symmetrically-adjusting pivots for a bolt of fabric comprising a stem, arms adapted to spread symmetrically relative to said stem and attached to said stem, and means for locking said arms against closure while opening, substantially as described.

8. In a fabric measuring and winding machine, a frame, pivot bearings on said frame, a bolt-pivot having symmetrically-spreading arms for inserting in one end of the bolt to be measured and a square stem, a tension-drum and adjustable tension-strap on said drum mounted on said frame, said tension-drum having a square orifice to receive said square stem, all coöperating to provide adjustable tension on the fabric while being rewound, substantially as described.

ABRAHAM KNOBEL.

Witnesses:
M. C. ROLLWAGE,
D. B. MEDANICH.